C. F. JAHNS.
GRAIN HARVESTER.
APPLICATION FILED MAY 22, 1911.

1,019,651.

Patented Mar. 5, 1912.
5 SHEETS—SHEET 1.

FIG. I.

WITNESSES:

INVENTOR
Charles F. Jahns
BY
ATTORNEYS

C. F. JAHNS.
GRAIN HARVESTER.
APPLICATION FILED MAY 22, 1911.

1,019,651.

Patented Mar. 5, 1912.
5 SHEETS—SHEET 3.

WITNESSES
G. Robert Thomas

INVENTOR
Charles F. Jahns
BY Mundle
ATTORNEYS

C. F. JAHNS.
GRAIN HARVESTER.
APPLICATION FILED MAY 22, 1911.

1,019,651.

Patented Mar. 5, 1912.

5 SHEETS—SHEET 5.

WITNESSES
G. Robert Thomas

INVENTOR
Charles F. Jahns
BY
ATTORNEYS

UNITED STATES PATENT OFFICE.

CHARLES FRED JAHNS, OF FOX LAKE, WISCONSIN.

GRAIN-HARVESTER.

1,019,651.  Specification of Letters Patent.  Patented Mar. 5, 1912.

Application filed May 22, 1911. Serial No. 628,641.

*To all whom it may concern:*

Be it known that I, CHARLES F. JAHNS, a citizen of the United States, and a resident of Fox Lake, in the county of Dodge and State of Wisconsin, have invented a new and Improved Grain - Harvester, of which the following is a full, clear, and exact description.

The object of the invention is to provide a new and improved grain harvester, arranged to cut the grain and bind it while in an upright position. In order to accomplish the desired result, use is made of a cutting mechanism for cutting the grain, carrying means for carrying the cut grain rearward and then sidewise and while held in an upright position, and an upright binder for finally binding the grain while in an upright position.

A practical embodiment of the invention is represented in the accompanying drawings forming a part of this specification, in which similar characters of reference indicate corresponding parts in all the views.

Figure 1:
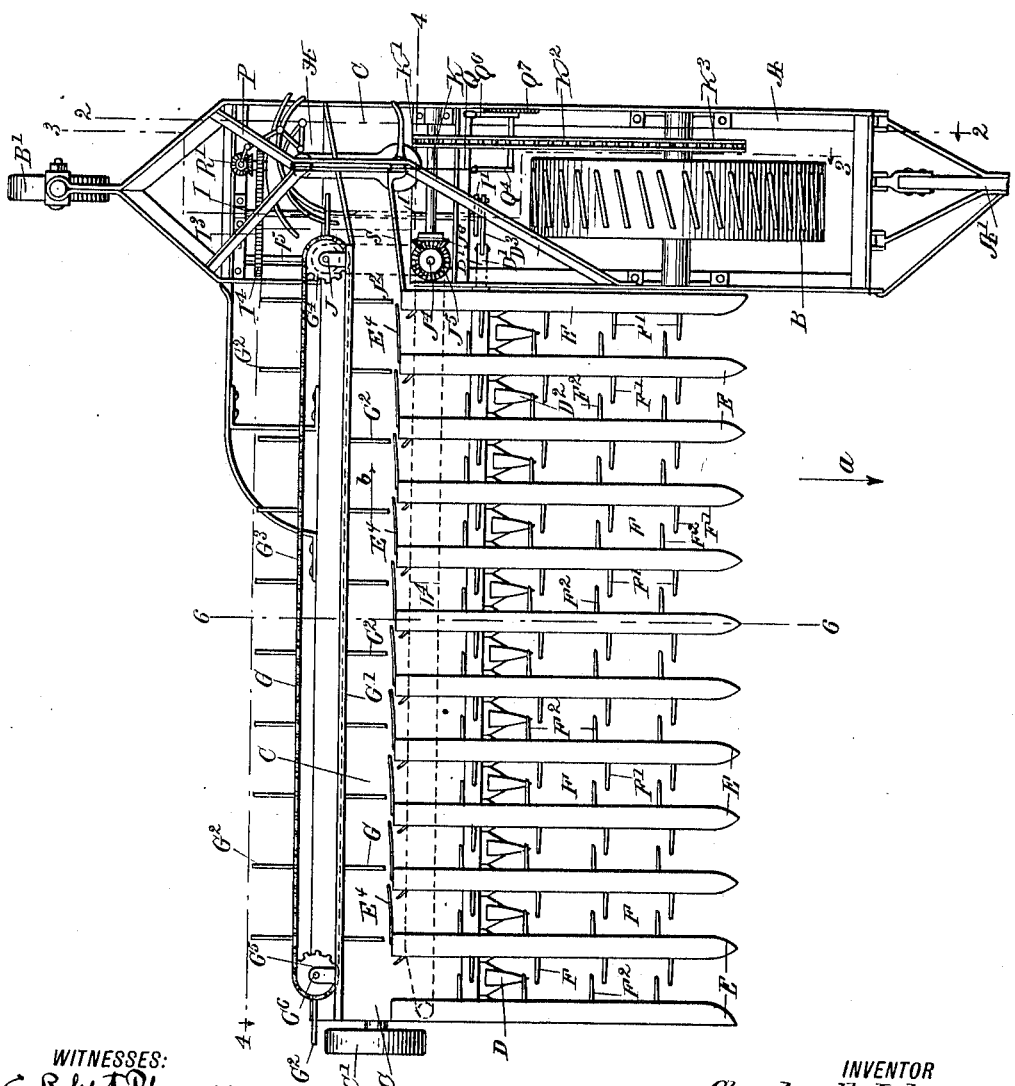
Figure 2:
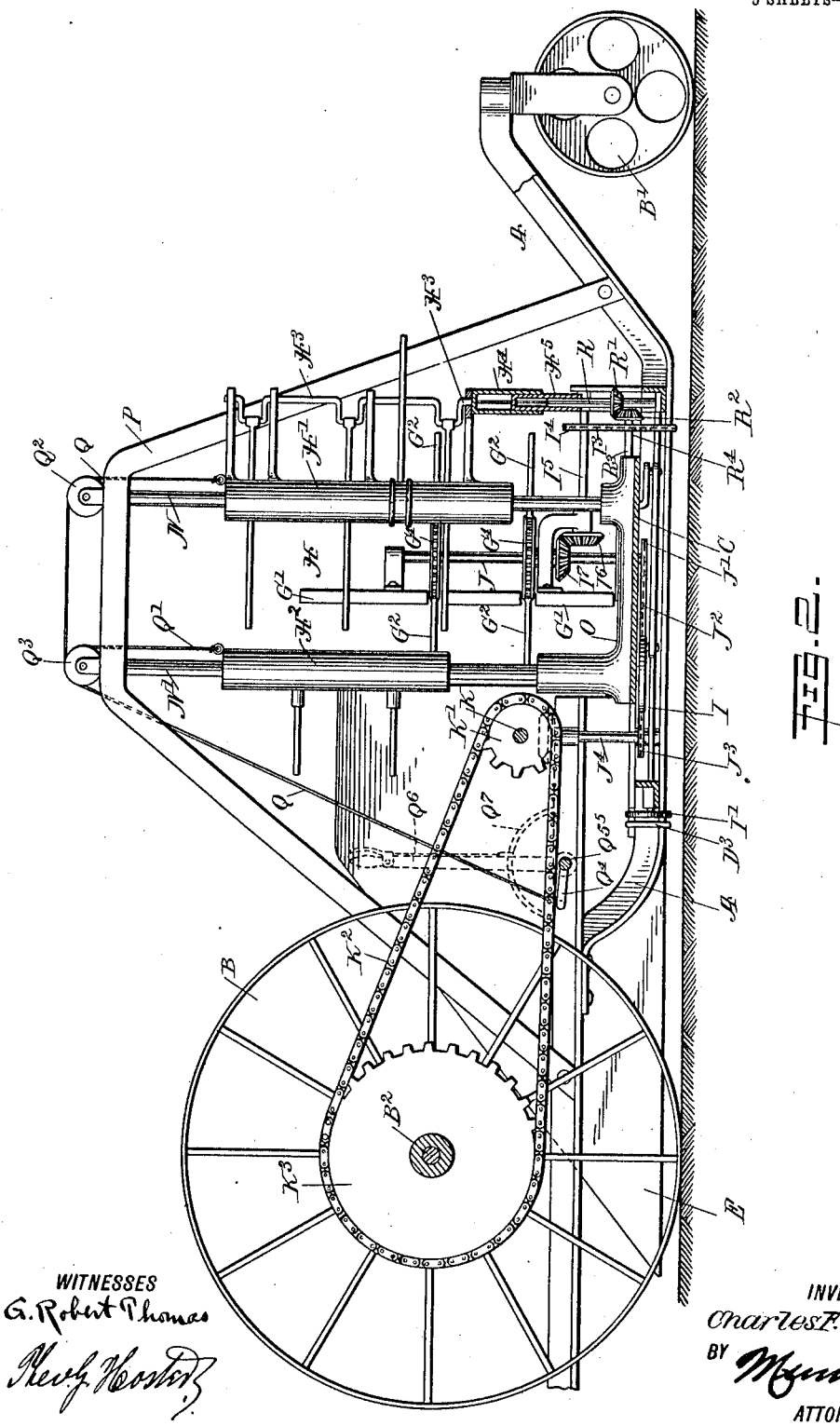
Figure 3:
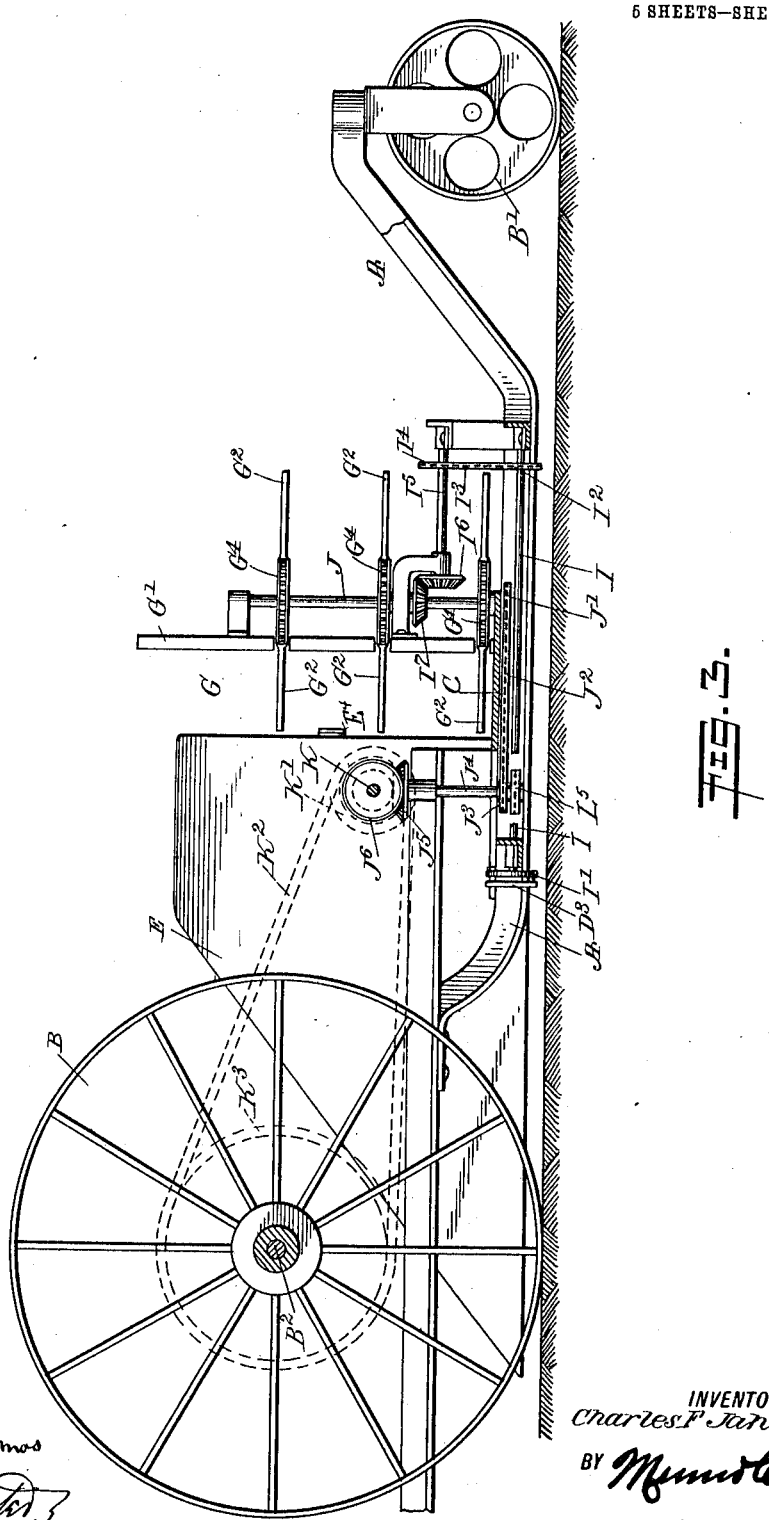
Figure 4:
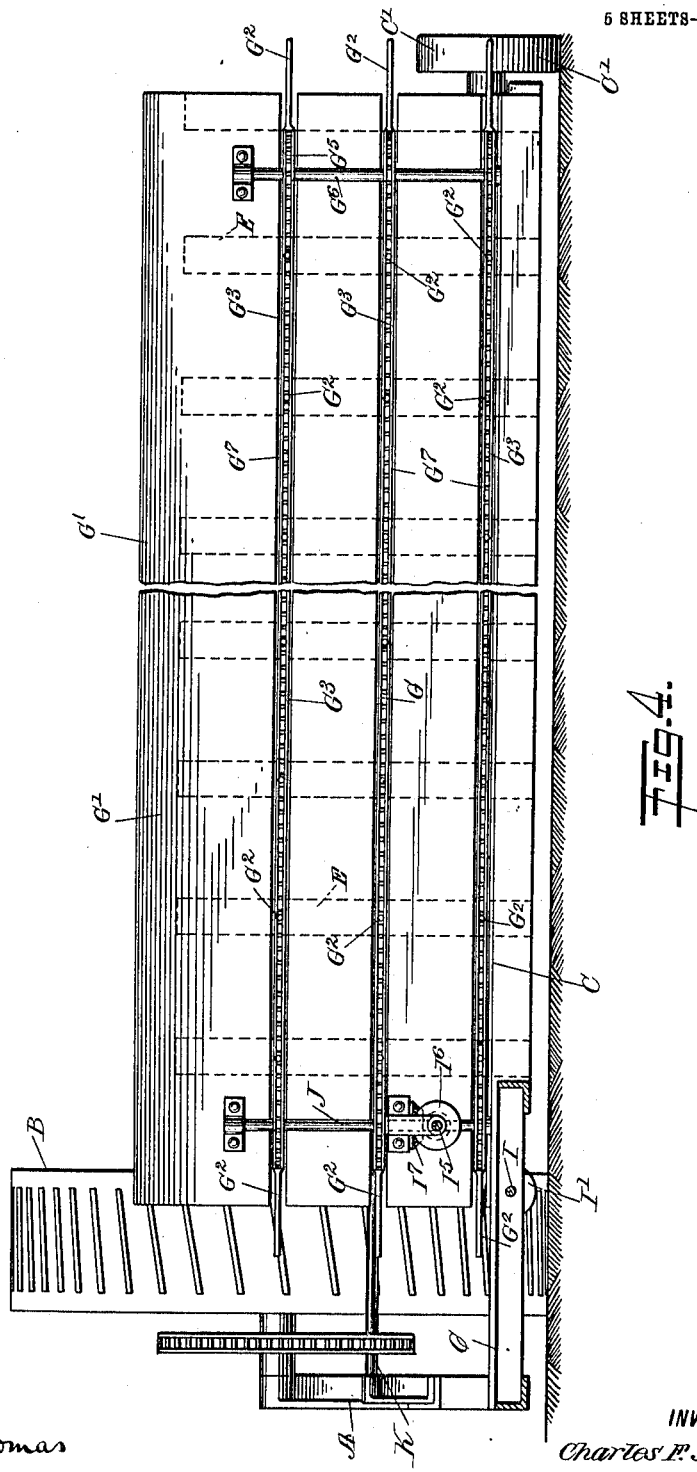
Figure 5:
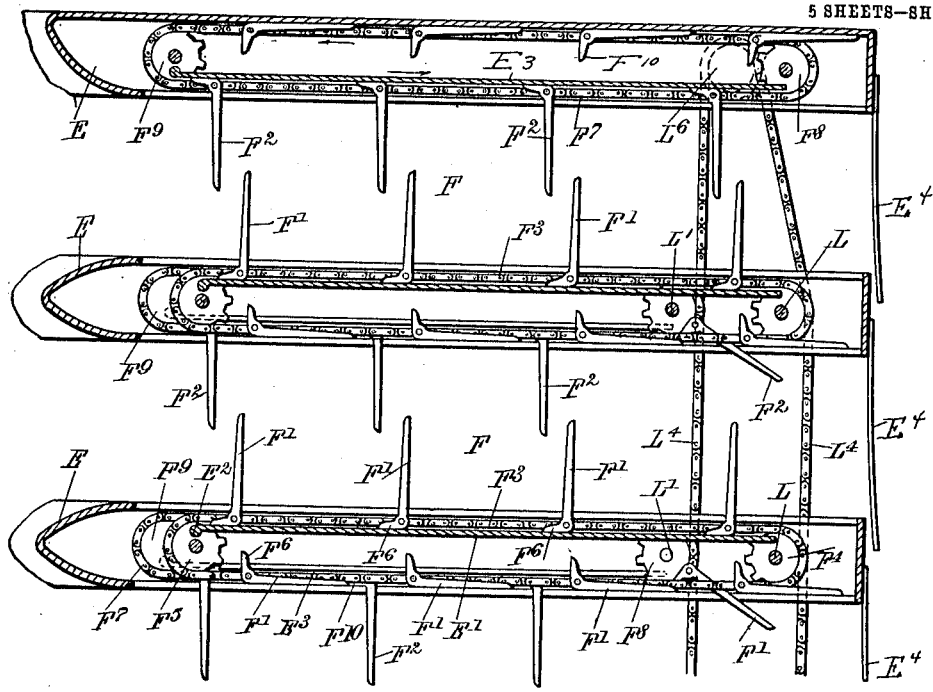
Figure 6:
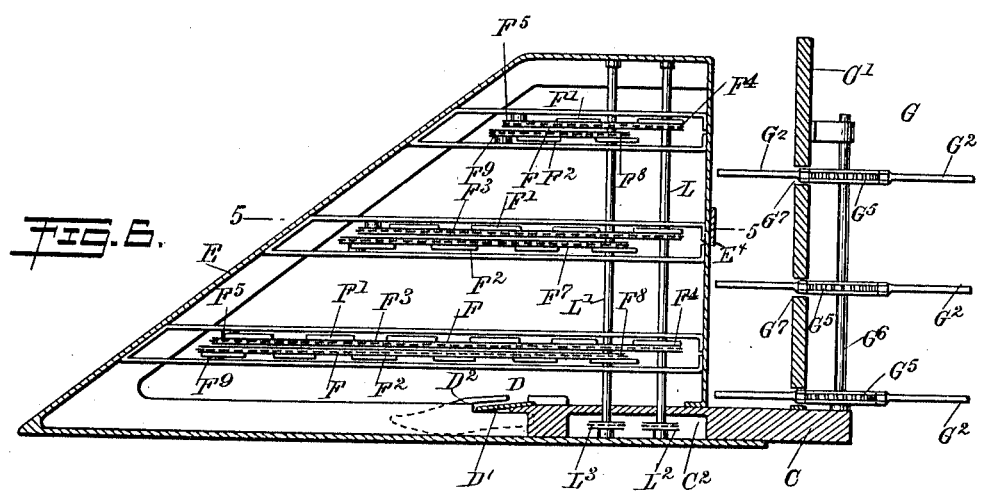
Figure 7:
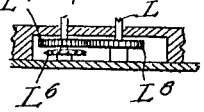

Figure 1 is a plan view of the grain harvester; Fig. 2 is an enlarged longitudinal section of the same on the line 2—2 of Fig. 1; Fig. 3 is a similar view of the same, on the line 3—3 of Fig. 1; Fig. 4 is an enlarged rear end view of the grain harvester, part being in section on the line 4—4 of Fig. 1; Fig. 5 is an enlarged sectional plan view of a number of the dividing frames and the longitudinal carrier mounted thereon with the platform and cutter bar removed, the section being on the line 5—5 of Fig. 6; Fig. 6 is an enlarged longitudinal section of the grain harvester, on the line 6—6 of Fig. 1, and Fig. 7 is a detail section illustrating parts to be hereinafter specifically referred to.

The main frame A of the grain harvester is provided with a traction wheel B and a rear supporting wheel or trailer B', and from one side of the frame A extends sidewise a platform C, provided at its outer end with a supporting wheel C' adapted to travel on the ground the same as the traction wheel B and the trailer B'. The usual draft mechanism A' is connected with the front end of the main frame A for drawing the grain harvester over the field in the direction of the arrow *a*, for cutting the grain and binding the same into sheaves, as hereinafter more fully explained.

A cutting mechanism D of the usual construction is arranged on the forward edge of the platform C for cutting the grain close to the ground, and transversely across the cutting mechanism D extend a series of parallel dividing frames E attached to the platform C and spaced apart, to divide the grain previous to reaching the cutting mechanism D, each dividing frame E having endless carriers F for holding the grain in upright position while cutting it by the cutting mechanism D, and for carrying the grain rearwardly in upright position and with the butts of the grain resting on the platform C. Over the rear portion of the platform C and in the rear of the frame E and the carriers F extends sidewise an endless conveyer G, receiving the grain in sections from the said carriers F and carrying the grain in upright position over the platform C in the direction of the arrow *b*, and finally delivering the grain to an upright binder H of any approved construction, for binding the grain while in upright position, and resting on the right-hand side of the platform C, the bound sheaf being finally dropped over the right-hand side of the platform C onto the ground.

The cutting mechanism D consists of the usual sickle bar D' and guards $D^2$, and the sickle bar D' is connected by a pitman $D^3$ with a crank disk I' on a shaft I journaled in suitable bearings on the main frame A and extending rearwardly, as plainly indicated in Figs. 1 and 3. On the rear end of the shaft I is secured a sprocket wheel $I^2$, over which passes a sprocket chain $I^3$ also passing over a sprocket wheel $I^4$ secured on a shaft $I^5$ journaled on the main frame A. On the shaft $I^5$ is secured a bevel gear wheel $I^6$ in mesh with a bevel gear wheel $I^7$ secured on a vertically-disposed shaft J, carrying at its lower end a sprocket wheel J' connected by a sprocket chain $J^2$ with a sprocket wheel $J^3$ secured on a vertical shaft $J^4$ journaled on the main frame A, and carrying a bevel gear wheel $J^5$ in mesh with a bevel gear wheel $J^6$ secured on a transversely-extending shaft K journaled on the main frame A. A sprocket wheel K' is secured on the shaft K and is connected by a sprocket chain $K^2$ with a sprocket wheel $K^3$ secured on the shaft $B^2$ of the traction wheel B, so that when the grain harvester is drawn over the ground in the direction of the arrow *a* then the rotary motion of the traction wheel B is transmitted by the gearing described to the shaft I so that the sickle bar D' is reciprocated to cut the grain.

Each of the dividing frames E is approximately trapezoidal in shape, as plainly indicated in Fig. 6, and each frame supports tiers of horizontally-disposed carriers F of different length according to the shape of the frame E, as will be readily understood by reference to Figs. 5 and 6. Each tier of the carriers in all the frames except the end frames consists essentially of upper and lower sets of arms F', F² adapted to project from opposite sides of a frame E and traveling rearwardly so as to hold the grain in vertical position while being cut by the cutting mechanism D, and to carry the cut-off grain in upright position onto the platform C. The upper set of arms F' is secured to an endless chain F³ passing around sprocket wheels F⁴ and F⁵, of which the rear sprocket wheel F⁴ is secured on a vertically-disposed shaft L, journaled in suitable bearings in the frame E, as plainly indicated in Fig. 6. The forward sprocket wheel F⁵ is journaled in the frame E. Each of the arms F' is provided at its pivotal end with a foot F⁶ adapted to travel on an arm E' forming part of the frame E, so as to hold the arm F' in extended position while traveling rearwardly and to allow the arm to fold on the return or forward movement, it being understood that when an arm F' during the return movement passes around the sprocket wheel F⁵ then the foot F⁶ strikes the forward end E² of the bar E', whereby the arm F' is again extended or swung outwardly into active position. The arms F² are pivoted on a sprocket chain F⁷ passing around sprocket wheels F⁸, F⁹, of which the rear sprocket wheel F⁸ is secured on a shaft L' journaled in the frame E, while the forward sprocket wheel F⁹ is journaled in the frame E. The arms F² are provided with angular arms F¹⁰ adapted to engage a bar E³, similar to the bar E', but arranged on the opposite side of the frame E, so that the arms F² are held projecting sidewise while traveling rearwardly and folded during the return movement on that side of the frame E on which the arms F' are extended at the time. The arms F² are projected sidewise again on traveling around the sprocket wheel F⁹ and engaging with their arms F¹⁰ the forward end of the bar E³.

It is understood that the shafts L and L' in each of the frames E carry the several sprocket wheels F⁴ and F⁸ of the tiers of carriers in that particular frame E, and the lower ends of the shafts L and L' extend into a recess C² formed in the platform C, and on the said lower ends are secured sprocket wheels L² and L³, over which pass the runs of a sprocket chain L⁴ passing around a sprocket wheel L⁵ on the shaft J⁴ previously mentioned, and rotated from the traction wheel B, as before explained.

The outermost frame E is provided in each tier of carriers F with a single set of arms F², and the chain L⁴ passes at this end over sprocket wheel L⁶ on a short shaft connected by gear wheels L⁷ and L⁸ to the shaft L on which is mounted the sprocket wheel F⁸ for chain F⁷ carrying the arms F², the same as in the other frames E. In a similar manner the innermost frame E is provided with arms F' but not with arms F². The arms F' and F² travel approximately at the same speed as the forward movement of the harvester so that the grain is held in an upright position while being cut by the cutting mechanism D, and then the cut grain is carried by the arms F', F² rearwardly on the platform C to finally reach the conveyer G.

The conveyer G is arranged as follows: On the platform C is arranged a longitudinally-extending barrier or guide wall G', spaced a distance from the rear ends of the frame E, and the said barrier G' limits the rearward movement of the cut grain and guides the latter in a transverse direction from the left to the right while being carried in the direction of the arrow b by arms G² arranged in tiers and projecting from sprocket chains G³ passing around sprocket wheels G⁴, G⁵, of which the sprocket wheels G⁴ are secured on the upright shaft J driven from the traction wheel B, as previously explained. The sprocket wheels G⁵ are secured on a vertical shaft G⁶ journaled on the left-hand end of the platform C, the barrier G' and at the rear thereof (see Figs. 1, 4 and 6). The shaft J previously mentioned is journaled near the right-hand side of the platform C and the corresponding end of the barrier G' (see Figs. 1, 3 and 4). The barrier G' is provided with lengthwise-extending slots G⁷ for the passage of the arms G². When the grain harvester is drawn over the field and a rotary motion is given to the shaft J, then a traveling motion is given to the sprocket chains G³ to cause the arms G' to travel longitudinally in the direction of the arrow b in front of the barrier G' and close to the rear ends of the frames E so that the cut grain is taken hold of by the front arms G² to convey the grain from the left to the right in the direction of the arrow b, and to finally deliver the cut grain in upright position to the binder H for the latter to bind the grain while in upright position.

The vertically-arranged binder H is in detail of the same construction as the one ordinarily used in the McCormick grain harvesters, so that further detailed description of the said binder H is not deemed necessary, it being, however, expressly understood that I do not limit myself to any particular form of binder as the same may be varied, the only requirement being that the binder binds the grain while standing in a vertical position.

It is desirable that the binder H be vertically adjustable to permit of binding grain of different height and to bring the binding twine the desired distance from the butts of the grain, and for this purpose the sleeves H' and H² of the binder are mounted to slide on vertical guide rods N, N', supported at their lower ends on a support O attached to the platform C, while the upper ends of the guide rods N and N' are held on an auxiliary frame P forming part of the main frame A. The upper ends of the sleeves H' and H² are attached to ropes or chains Q, Q', passing over guide pulleys Q², Q³ to connect with an arm Q⁴ held on a shaft Q⁵ journaled on the main frame A, and provided with a hand lever Q⁶ under the control of the operator and adapted to be locked on a segment Q⁷ attached to the main frame A. Thus by the operator manipulating the hand lever Q⁶, the sleeves H' and H² can be raised or lowered in unison according to the height of the grain to be bound at the time.

The crank shaft H³ of the binding mechanism is journaled on the sleeve H' and is provided with telescoping sleeves H⁴, H⁵, of which the sleeve H⁵ has sliding connection with a vertical shaft R journaled on the main frame A and carrying a bevel gear wheel R' in mesh with a bevel gear wheel R² secured on a shaft R³ journaled on the support O and carrying a sprocket wheel R⁴ engaged by the sprocket chain I³ previously mentioned and driven from the traction wheel B, so that when the harvester is moved over the field then a rotary motion is given to the shaft R³ which in turn rotates the shaft R, and the latter imparts a rotary motion to the crank shaft H³ of the binder H. By having the sliding connection between the crank shaft H³ and the shaft R, the binder mechanism can be raised or lowered for binding grain of different length, without disconnecting the shafts R and H³.

Guiding arms S extend from the delivery end of the conveyer G and the right-hand end of frame E to the binder H so as to hold the grain in vertical position during the time it passes from the conveyer G to the binder H (see Fig. 1).

The operation is as follows: When the grain harvester is drawn over the field then a rotary motion is given to the several mechanisms by the traction wheel B. As the grain harvester is drawn forward in the direction of the arrow $a$, the grain passes between adjacent dividing frames E in which travel rearwardly the arms F' and F² so that the grain is held in an upright position and is cut off by the cutting mechanism D while in such position. The arms F' and F² carry the cut off grain rearwardly onto the platform C, the rearward movement of the grain being limited by the barrier G'. The arms G² at the front of the barrier now take hold of the cut off grain and push the same from the left to the right in the direction of the arrow $b$ sidewise over the platform C and while the grain is in upright position. The grain is finally passed by the arms G² to the binder H which binds the grain while in upright position, and the bound sheaves are finally dropped off the right-hand side of the platform C onto the ground. In order to deliver the grain in sections to the arms G², it is desirable to provide the rear ends of the frames E with springs E⁴ extending across the gap between adjacent frames so that the grain accumulates between adjacent frames E until sufficient grain has accumulated to open the springs E⁴ to allow the bunch of accumulated grain to pass to the arms G².

Having thus described my invention, I claim as new and desire to secure by Letters Patent:

1. A grain harvester, comprising a cutting mechanism, parallel spaced dividing and carrying means extending transversely over the said cutting mechanism for dividing the grain and carrying the cut grain while in upright position rearwardly beyond the cutting mechanism, conveying means extending sidewise and receiving the grain from the said dividing and carrying means and conveying it sidewise over the platform and while the grain is in upright position, means normally closing the said dividing and carrying means at the rear, and adapted to open under pressure to deliver the grain to said conveying means and an upright binder for binding the grain delivered by the said conveying means and while the grain is in vertical position.

2. A grain harvester, comprising a main frame, a sidewise-extending platform, a cutting mechanism mounted on the forward edge of the platform, a series of parallel spaced dividing frames mounted on the said platform and projecting beyond the said cutting mechanism, transverse carriers mounted on the said dividing frames for holding the grain in upright position sidewise over the said platform, spring members at the rear ends of said dividing frames, one of said members being secured to each frame and bearing against the next adjacent frame in one direction, so as to normally close the space therebetween and an upright binder over the said platform adjacent the delivery end of the said sidewise conveyer for binding the grain while in upright position.

3. A grain harvester provided with a cutting mechanism and vertical dividing frames spaced apart and extending transversely over the cutting mechanism and projecting beyond the front and rear thereof, sidewise projecting carriers mounted to travel on the said dividing frames in a rearward direction to hold the grain in upright position while cutting it and conducting the cut grain rearwardly while in upright position, the carrier for each frame having tiers of driven endless chains, each tier comprising two oppositely movable chains, horizontal arms pivoted on the said chains, and means for holding the arms extended during their rearward travel and to hold the arms folded during their return movement.

4. A grain harvester provided with a cutting mechanism and vertical dividing frames spaced apart and extending transversely over the cutting mechanism and projecting beyond the front and rear thereof, sidewise projecting carriers mounted to travel on the said dividing frames in a rearward direction to hold the grain in upright position while cutting it and conducting the cut grain rearwardly while in upright position, the carrier for each frame having tiers of driven endless chains and arms, each tier having two endless chains traveling in opposite directions, and two sets of horizontal arms pivoted on the said chains, and means for holding the two sets of arms extended on opposite sides of the frame during their rearward movement and to fold the said arms during their return or forward movement.

5. A grain harvester provided with a cutting mechanism and vertical dividing frames spaced apart and extending transversely over the cutting mechanism and projecting beyond the front and rear thereof, and sidewise projecting carriers mounted to travel on the said dividing frames in a rearward direction to hold the grain in upright position while cutting it and conducting the cut grain rearwardly while in upright position, the carrier for each frame having tiers of driven endless chains and arms, each tier having two endless chains traveling in opposite directions, two sets of horizontal arms pivoted on the said chains, means for holding the two sets of arms extended on opposite sides of the frame during their rearward movement and to fold the side arms during their return or forward movement, and means for imparting simultaneous movement to the chains in the several frames.

In testimony whereof I have signed my name to this specification in the presence of two subscribing witnesses.

CHARLES FRED JAHNS.

Witnesses:
RALPH CLARK,
JNO. PARKER.

---

Copies of this patent may be obtained for five cents each, by addressing the "Commissioner of Patents, Washington, D. C."